G. D. SMITH.
WATER WHEEL GOVERNOR.
APPLICATION FILED JUNE 26, 1916.

1,284,484.

Patented Nov. 12, 1918.

2 SHEETS—SHEET 1.

Inventor
Guy D. Smith
By his Attorneys
Prindle, Wright & Small

G. D. SMITH.
WATER WHEEL GOVERNOR.
APPLICATION FILED JUNE 26, 1916.

1,284,484.

Patented Nov. 12, 1918.
2 SHEETS—SHEET 2.

Inventor
Guy D. Smith
By his Attorneys
Pringle, Wright & Small

UNITED STATES PATENT OFFICE.

GUY D. SMITH, OF DERBY, VERMONT.

WATER-WHEEL GOVERNOR.

1,284,484.  Specification of Letters Patent.  Patented Nov. 12, 1918.

Application filed June 26, 1916. Serial No. 105,892.

*To all whom it may concern:*

Be it known that I, GUY D. SMITH, of Derby, in the county of Orleans, and in the State of Vermont, have invented a certain new and useful Improvement in Water-Wheel Governors, and do hereby declare that the following is a full, clear, and exact description thereof.

My invention relates particularly to an apparatus designed for controlling the speed of water wheels, and especially to an apparatus of this type controlled by electrical means.

The object of my invention is to provide an apparatus of this character which is very simple, and which permits of flexibility in speed and operation, and in which there are few wearing parts, and only simple adjustments required; which is very adaptable to electric power stations, and which is arranged so as to save power to a considerable extent, and which is provided with a safety catch for throwing the apparatus out of operation entirely when the speed is excessively low due to the presence of a broken belt or other causes, but without closing the catch, and without disturbing the load upon the water wheel.

While my invention is capable of embodiment in many different forms, for the purpose of illustration I have shown only one form thereof in the accompanying drawings, in which—

Figure 1:
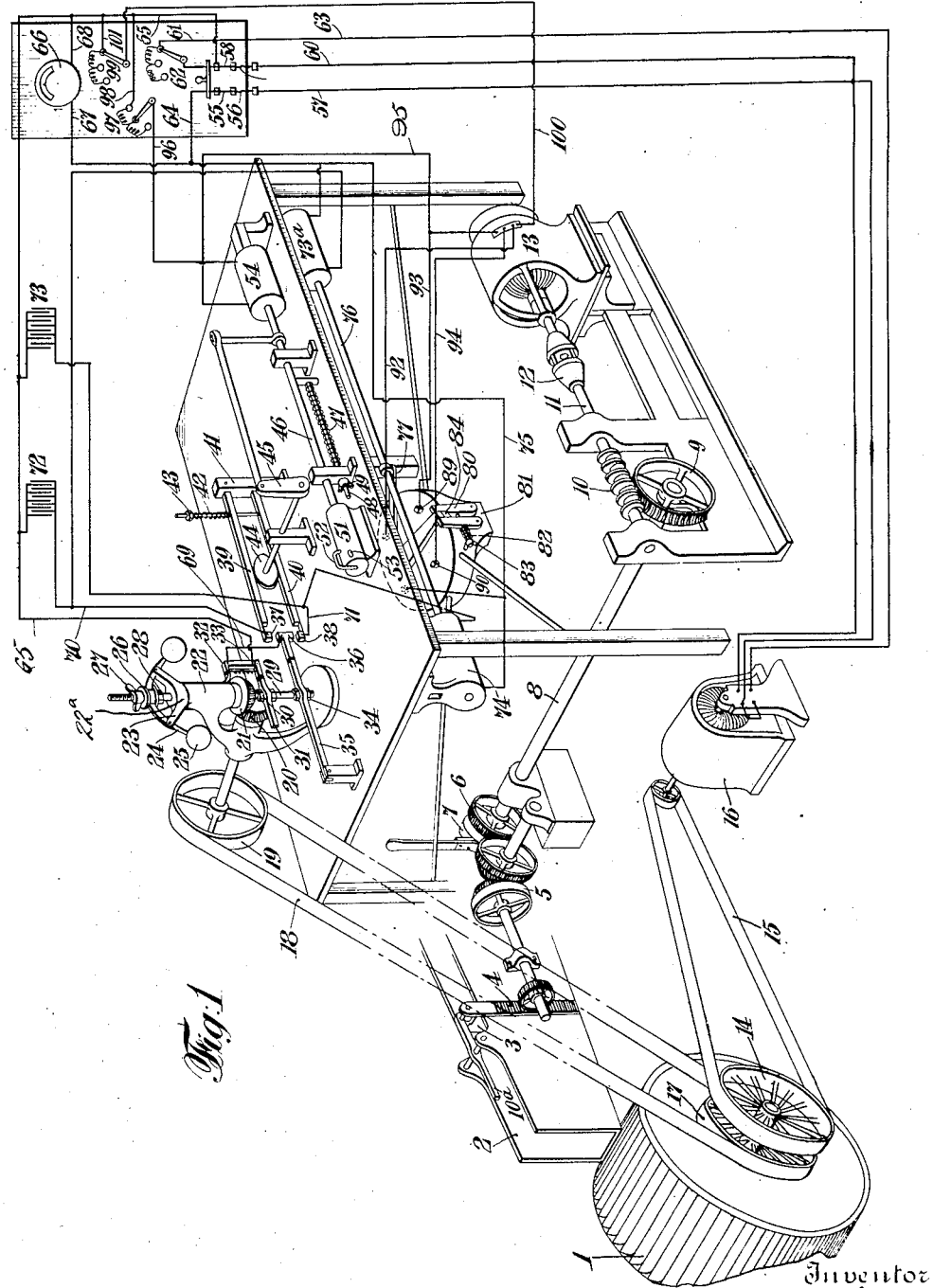
Figure 2:
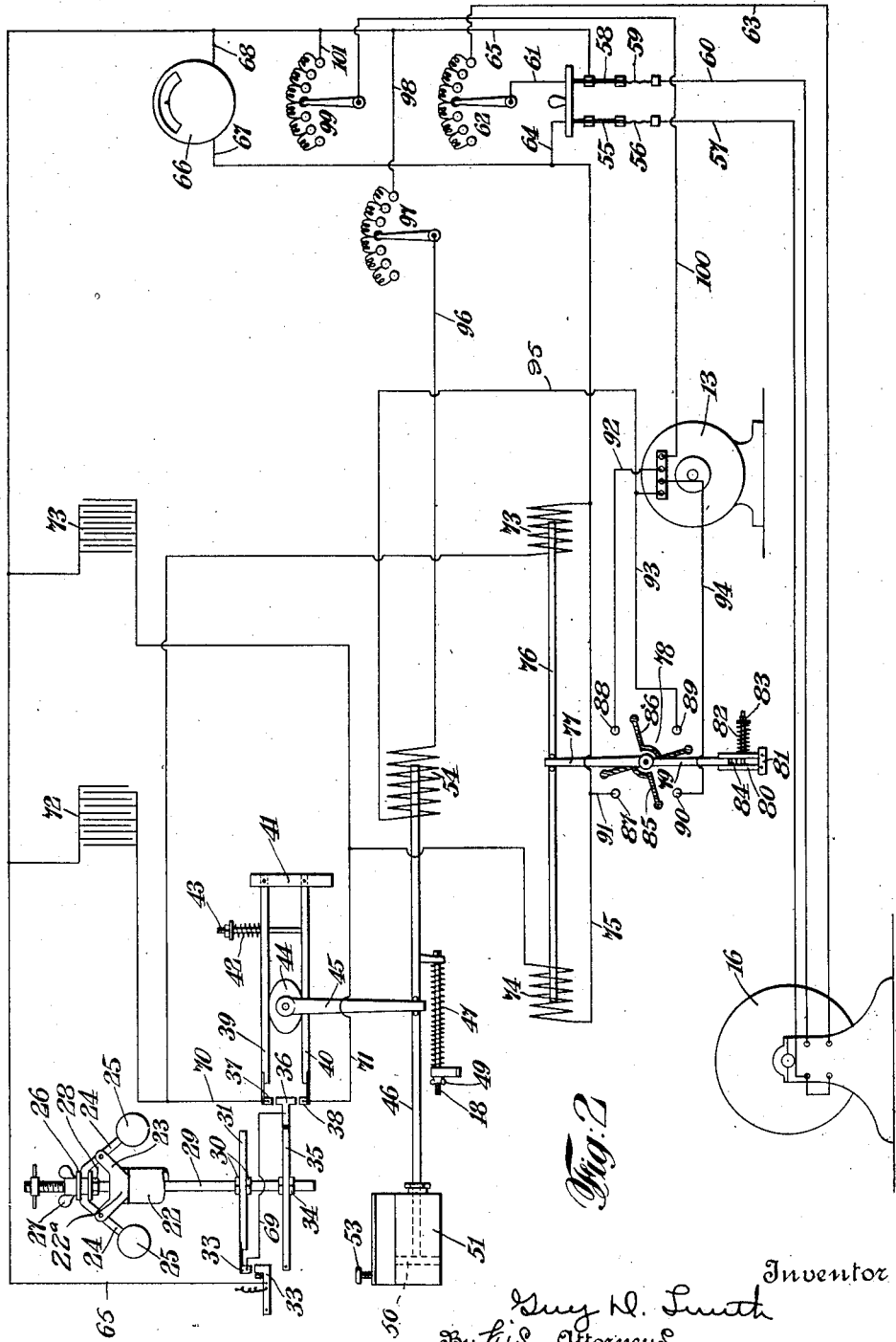

Figure 1 is a somewhat diagrammatic persective view of an apparatus made in accordance with my invention; and Fig. 2 is a diagrammatic view of the same showing the wiring.

In the drawings I have shown a water wheel 1 adapted to be operated by a stream of water issuing from a conduit 2 having a gate 3 provided with a rack 4, and connected by a train of gears 5 for raising and lowering the gate, to a gear 6 adapted to be connected by a clutch 7 to a shaft 8 having a worm wheel 9 operated by a worm 10. Attached to the rack 4 there is, furthermore, provided a hand lever 10ª to be used in starting the apparatus. The worm 10 is located on a shaft 11 provided with a flexible joint 12 for connecting the same to a motor 13.

The water wheel 1 if desired, may be provided with a pulley 14, which is connected by a belt 15 to a generator 16 for providing current to operate the motor 13 and the other parts of the apparatus. Said water wheel 1, furthermore, is provided with a pulley 17 which is connected by a belt 18 to a governor-operating pulley 19. The pulley 19 drives a bevel gear 20 on the same shaft therewith, and said gear 20 drives a bevel gear 21 connected to a governor head 22 supporting a collar 22ª having ears 23 in which there are pivoted arms 24 carrying governor balls 25. The arms 24 operate a sleeve 26 having nuts 27 and 28 below and above said sleeve 26, respectively, and adjustably located on the governor rod 29, which passes through the sleeve 26. By the adjustment of the nuts 27 and 28, the range of the governor can be controlled. On the lower end of the rod 29 there are provided nuts 30 for operating an arm 31 having at its end a contact 33 normally engaging with a stationary contact 32, but breaking circuit therewith when the speed of the water wheel becomes excessively low. On the same end of the rod 29 there is, furthermore, provided a sleeve 34 for moving a lever 35 having on its end a contact 36 for coöperating with upper and lower stationary contacts 37 and 38 located respectively on levers 39 and 40, and which have between the same a connecting link 41 provided with an interposed spring 42 and a thumb screw 43. When the lever 35 is mid-way between the contacts 37 and 38, the water wheel is running at normal speed. When the speed becomes too low, or too high, it completes the circuit through either the contact 37 or the contact 38. When so completed, the circuit is broken at intervals by means of a cam 44 carried by a lever 45 operated by a rod 46 normally withdrawn in one direction by a spring 47 carried by a rod 48 and having an adjusting thumb screw 49. The speed of the rod 46 is controlled by a piston 50 on one end of said rod located in a dash pot 51 which dash pot has a by-pass 52 controlled by an adjusting screw 53. The rod 46 is operated by a solenoid 54.

The generator 16 is connected to the system by a switch, one arm, 55, of which leads through a fuse 56 and a wire 57 to said generator 16, and the other arm, 58, of which leads by a fuse 59 and a wire 60 to said generator, as well as through a wire 61 and a generator rheostat 62 and a wire 63 to the generator field. From the two arms 55 and 58 of the switch, wires 64 and 65 lead to the remainder of the system. Between these wires 64 and 65 there is bridged a volt meter 66 by means of wires 67 and 68, to give the voltage of the dynamo. Said wire 65 is, furthermore, extended so as to be connected to the contact 32. The contact 33 coöperating therewith is connected by a wire 69 to the contact 36. Connected to the contacts 37 and 38 there are wires 70 and 71 between which, and wire 65 are inserted condensers 72 and 73 so as to prevent sparking between the contacts 36, 37 and 38. These wires 70 and 71 are connected respectively to solenoids 73ª and 74 having a common lead 75 connecting the same to the wire 64. The solenoids 73ª and 74 are provided for operating an armature 76 which is connected to an operating lever 77 and a motor reversing switch 78. The switch 78 is provided for reversing the direction of rotation of the motor 13. The lever 77 of the switch 78 has an extension 79 located between the pivoted arms 80 held together by means of a link 81 having an interposed spring 82 and an adjusting nut 83. A stop 84 is provided between the arms 80 so as to normally maintain the lever 77 in middle position. The reversing switch 78 is provided with two circuit connecting members 85 and 86, which are designed to make and break the circuits between four contacts, 87, 88, 89, and 90, located on said switch. The contact 87 is connected by a wire 91 to the lead 75 and contacts 88, 89, and 90 are connected respectively to the motor 13 by means of wires 92, 93, and 94. From the wire 93 a wire 95 leads to the solenoid 54, and said solenoid 54 is, furthermore, connected by a wire 96 to a rheostat 97 having a wire 98 connecting it to the wire 65. A motor rheostat 99 has a wire 100 leading to the motor 13 and a wire 101 connecting it to the wire 65.

In the operation of my invention, in order to start the apparatus, the switch comprising the arms 55 and 58 is opened and the clutch 70 is disconnected. The hand lever 10ª is now operated so as to elevate the gate 3. The water wheel 1 is thus rotated and the water wheel drives the generator 16. As soon as the generator 16 has received sufficient power, the switch comprising the arms 55 and 58 is closed and the clutch 7 moved so as to connect gear 6 with the shaft 8. If now the speed of the water wheel 1 is too low, the arms 24 carrying the balls 25 assume a low position, thus elevating the rod 29 and causing the contact 36 to engage contact 37. This completes the circuit, 60, 58, 65, 33, 32, 69, 36, 37, 70 to the solenoid 73ª and moves the armature 76 to one side, thus operating the switch 78 so as to close the circuit to the motor 13 and elevate the gate 3 so as to supply more water to the water wheel 1. The completion of the circuit in this manner, however, also energizes the solenoid 54 so as to move the armature 46 and thus operate the cam 44 so as to disconnect the contacts 36 and 37, thus breaking the circuit. If the speed of the water wheel is well below the normal, the spring 47 will pull the lever 45 back again to its middle position, thus again completing the circuit through the contacts 36 and 37. The circuit will thus be intermittently opened and closed with the contacts 36 and 37 until the speed of the water wheel 1 is no longer too low. In case the speed of the water wheel becomes excessive, a circuit is completed through the contacts 36 and 38 which actuates the solenoid 74 so as to move the switch 78 in the opposite direction and drive the motor 13 in the opposite direction. This causes the lowering of the gate 3 and the supply of less water to the water wheel 1. The circuit is under these conditions likewise intermittently opened and closed until the speed of the water wheel is no longer excessive. In this way the water wheel is caused to assume its normal speed, irrespective of the load placed upon it. In case an accident should occur, for example, the breaking of the belt 18, thereby producing an unusually low speed in the governor, the arms 24 carrying the balls 25 will assume an extremely low position, thereby elevating the rod 29 so as to disconnect the contacts 32 and 33, and thus break the circuit to contact 36, without, however, discontinuing the supply of water to the water wheel 1. The voltage of the generator can be determined at all times by means of the volt member 66. Should it be desired to change or adjust the generator 16 this can be done by operating the rheostat 62. The voltage of the current supplied to the motor 13 can also be controlled by means of the rheostat 99. Furthermore, the voltage of the current supplied to the solenoid 54 can be adjusted by the rheostat 97. The condensers 72 and 73 avoid sparking between the contacts 36, 37 and 38. The dash pot 51 provides for a uniform movement of the armature 46.

While I have described my invention above in detail, I wish it to be understood that many changes may be made therein without departing from the spirit of my invention.

I claim:—

1. A water wheel governor having means for supplying more or less water to the water wheel, according to whether the speed of the turbine is below or above normal, and electrically-operated means for intermittently interrupting the controlling action of the governor during the increased or decreased speed, comprising a speed responsive device, contacts adapted to be closed thereby, and a cam for disconnecting said contacts.

2. A water wheel governor having means for supplying more or less water to the water wheel, according to whether the speed of the turbine is below or above normal, and electrically-operated means for intermittently interrupting the controlling action of the governor during the increased or decreased speed until the water wheel assumes its normal speed, comprising a speed responsive device, contacts adapted to be closed thereby, and a cam for disconnecting said contacts.

3. A water wheel governor having means for supplying more or less water to the water wheel, according to whether the speed of the turbine is below or above normal, electrically-operated means for intermittently interrupting the controlling action of the governor during the increased or decreased speed, comprising a speed responsive device, contacts adapted to be closed thereby, a cam for disconnecting said contacts, and a solenoid for operating said cam.

4. A water wheel governor having means for supplying more or less water to the water wheel, according to whether the speed of the turbine is below or above normal, and electrically-operated means for intermittently interrupting the controlling action of the governor during the increased or decreased speed until the water wheel assumes its normal speed, comprising a speed responsive device, contacts adapted to be closed thereby, and a cam for disconnecting said contacts, and a solenoid for operating said cam.

5. A water wheel governor having means for supplying more or less water to the water wheel, according to whether the speed of the turbine is below or above normal, electrically-operated means for intermittently interrupting the controlling action of the governor during the increased or decreased speed, comprising a speed responsive device, contacts adapted to be closed thereby, and a dash pot controlled cam for disconnecting said contacts.

6. A water wheel governor having means for supplying more or less water to the water wheel, according to whether the speed of the turbine is below or above normal, electrically-operated means for intermittently interrupting the controlling action of the governor during the increased or decreased speed until the water wheel assumes its normal speed, comprising a speed responsive device, contacts adapted to be closed thereby, and a dash pot controlled cam for disconnecting said contacts.

7. A water wheel governor having means for supplying more or less water to the water wheel, according to whether the speed of the turbine is below or above normal, electrically-operated means for intermittently interrupting the controlling action of the governor during the increased or decreased speed, comprising a speed responsive device, contacts adapted to be closed thereby, and a dash pot controlled cam for disconnecting said contacts, and a solenoid for operating said cam.

8. A water wheel governor having means for supplying more or less water to the water wheel, according to whether the speed of the turbine is below or above normal, and electrically-operated means for intermittently interrupting the controlling action of the governor during the increased or decreased speed until the water wheel assumes its normal speed, comprising a speed responsive device, contacts adapted to be closed thereby, and a dash pot controlled cam for disconnecting said contacts, and a solenoid for operating said cam.

9. A water wheel governor having means for increasing or decreasing the supply of water thereto according to whether the speed of the water wheel is below or above normal, a motor for actuating said means, and control circuits for the motor adapted to control its direction and extent of motion in correspondence with load changes of the wheel, and means for intermittently interrupting the controlling action of said motor upon such water supply means.

10. A water wheel governor having means for increasing or decreasing the supply of water thereto according to whether the speed of the water wheel is below or above normal, a motor for actuating said means, control circuits for the motor, including a reversing switch adapted to control its direction and extent of motion in correspondence with load changes of the wheel, and means for intermittently interrupting the controlling action of said motor upon such water supply means.

11. A water wheel governor having means for increasing or decreasing the supply of water thereto according to whether the speed of the water wheel is below or above normal, a motor for actuating said means, and control circuits for the motor including a solenoid operated reversing switch adapted to control its direction and extent of motion in correspondence with load changes of the wheel and means for intermittently breaking circuit to said motor during periods of abnormal speed.

12. A water wheel governor having means for increasing or decreasing the supply of water thereto according to whether the speed of the water wheel is below or above normal, a motor for actuating said means and control circuits for the motor adapted to control its direction and extent of motion in correspondence with load changes of the wheel, and means for throwing said motor out of circuit in case of excessively low speed.

13. A water wheel governor having means for increasing or decreasing the supply of water thereto according to whether the speed of the water wheel is below or above normal, a motor for actuating said means, control circuits for the motor, including a reversing switch adapted to control its direction and extent of motion in correspondence with load changes of the wheel, and means for throwing said motor out of circuit in case of excessively low speed.

14. A water wheel governor having means for increasing or decreasing the supply of water thereto according to whether the speed of the water wheel is below or above normal, a motor for actuating said means, and control circuits for the motor including a solenoid operated reversing switch adapted to control its direction and extent of motion in correspondence with load changes of the wheel, and means for throwing said motor out of circuit in case of excessively low speed.

15. A water wheel governor having means for supplying more or less water to the water wheel, according to whether the speed of the turbine is below or above normal, electrically-operated means for intermittently interrupting the controlling action of the governor during the increased or decreased speed, comprising contacts closed by the abnormal speed of the turbine, a cam for disconnecting said contacts during the abnormal speed, a solenoid for operating said arm, and a rheostat included in the circuit with said solenoid.

16. A water wheel governor having means for supplying more or less water to the water wheel, according to whether the speed of the turbine is below or above normal, electrically-operated means for intermittently interrupting the controlling action of the governor during the increased or decreased speed until the water wheel assumes its normal speed, comprising contacts closed by the abnormal speed of the turbine, a cam for disconnecting said contacts during the abnormal speed, a solenoid for operating said arm, and a rheostat included in the circuit with said solenoid.

17. In a device of the class described, a speed responsive mechanism, a reversing switch controlled thereby, and an electric motor at rest during normal speed and in circuit with said switch, means being provided to throw said motor out of circuit in case of excessively low speed.

18. In a device of the class described, a speed responsive mechanism, a pair of opposed magnets, a reversing switch operated by said magnets, circuit closing devices actuated by said mechanism for selectively energizing said magnets, and a motor in circuit with said reversing switch.

19. In a device of the class described, a speed responsive mechanism, a contact arm movable therewith, a pair of contacts selectively engageable with said arm, a motor, means operated by the engagement of the arm with said contacts for rotating said motor in opposite directions, means being provided to throw said motor out of circuit in case of excessively low speed.

20. In a device of the class described, a speed responsive mechanism, a contact arm movable therewith, a pair of contacts selectively engageable with said arm, a motor, means operated by the engagement of the arm with said contact for rotating said motor in opposite directions, and means for intermittently breaking the circuit including said arm and contacts.

21. In a device of the class described, a speed responsive mechanism, a contact arm movable therewith, a pair of contacts selectively engageable with said arm, a pair of opposed magnets connected respectively to said contacts, a reversing switch operated by said magnets, and an electric motor in circuit with said reversing switch.

22. In a device of the class described, a speed responsive mechanism, a contact arm movable therewith, a pair of contacts selectively engageable with said arm, a motor, means operated by the engagement of the arm with said contacts for rotating said motor in opposite directions, and a device for rendering said motor operating means inoperative during excessive low speed.

23. A water wheel governor having means for increasing or decreasing the supply of water thereto according to whether the speed of the water wheel is below or above normal, a motor for actuating said means, means for intermittently breaking circuit to said motor during abnormal speed, and means for throwing said motor out of circuit in case of excessively low speed.

In testimony that I claim the foregoing I have hereunto set my hand.

GUY D. SMITH.

Witnesses:
F. S. TINKHAM,
TOM C. CAMP.